UNITED STATES PATENT OFFICE.

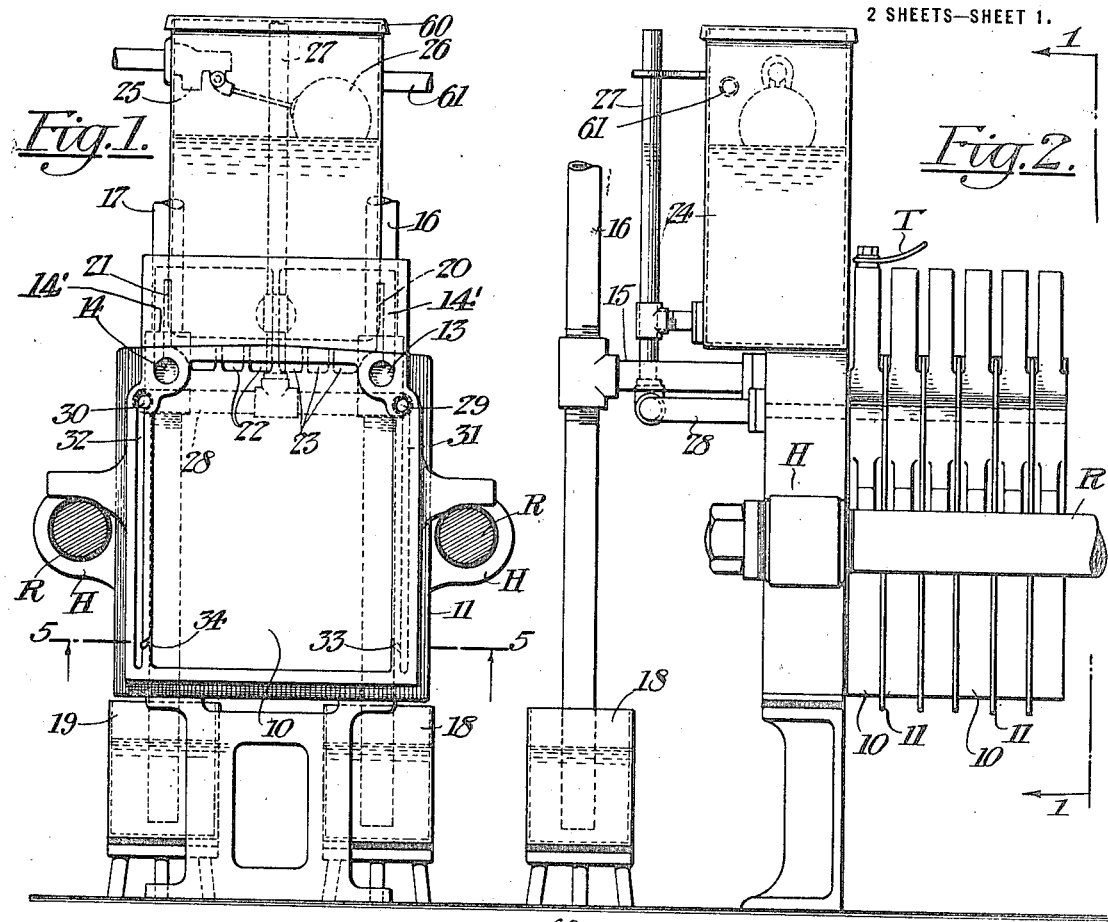

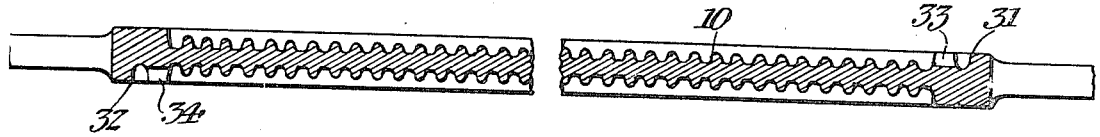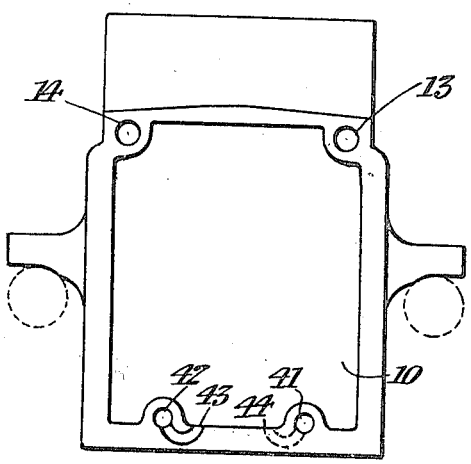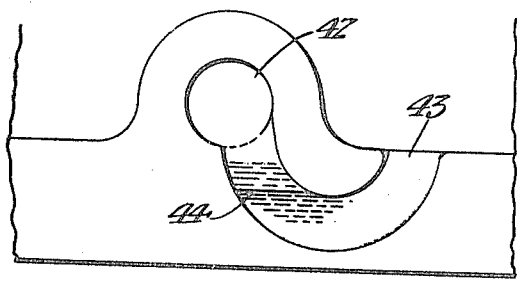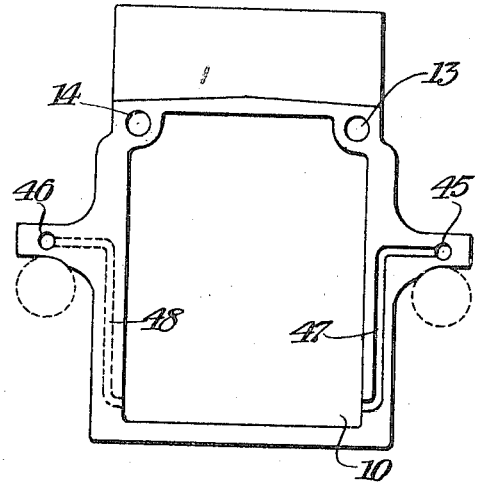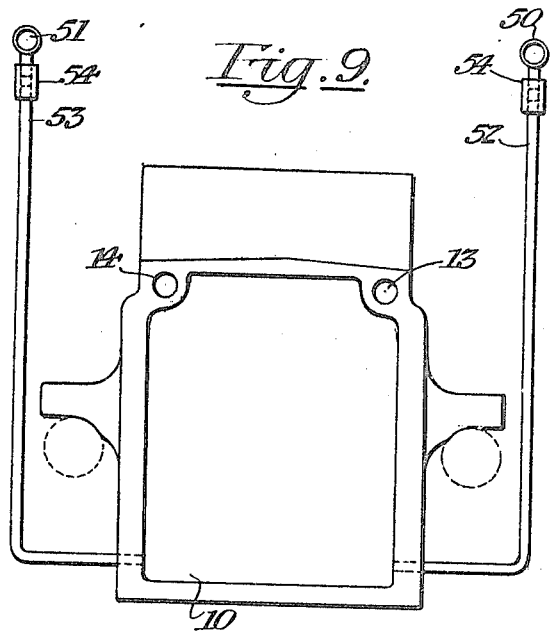

HARRY T. SHRIVER, OF WEST ORANGE, NEW JERSEY.

ELECTROLYTIC APPARATUS.

1,239,530. Specification of Letters Patent. Patented Sept. 11, 1917.

Application filed May 25, 1915, Serial No. 30,285. Renewed April 17, 1916. Serial No. 91,751.

*To all whom it may concern:*

Be it known that I, HARRY T. SHRIVER, a citizen of the United States, residing at Llewellyn Park, West Orange, in the county of Essex, State of New Jersey, have invented certain new and useful Improvements in Electrolytic Apparatus; and I do declare the following to be a full, true, and exact description of the said invention, such as will enable others skilled in the art to which it appertains to make use of the same.

This invention relates to electrolytic apparatus such as is particularly suited for decomposing liquids, generally water, into their constituent gases.

It has been customary heretofore in constructing electrolyzers of the filter press type to provide ducts extending through the several cells to carry away gases formed while the machine is in action, and other ducts to supply electrolyte to the cells. The level of the electrolyte in the apparatus has been such that the gas ducts are themselves largely filled with electrolyte and the electrolyte circulates through such ducts as well as the supply ducts. In electrolyzers of this type, wherein the different cells are in series, any path provided for the current other than that passing from an anode to a cathode, cuts down the efficiency of the machine and wastes the current. The gas ducts and electrolyte supply ducts of such a machine, when filled with electrolyte, provide such paths. It is one of the objects of my invention to arrange the apparatus so that none of these ducts will furnish a path for the current.

In my pending application No. 18,870, filed April 3, 1915, I have illustrated various forms of plates for an electrolyzer of the filter press type in which provision is made to prevent the electrolyte from flowing through the gas ducts. In the apparatus which I illustrated in said application, the diluent is supplied at the bottom of each cell through a duct or ducts passing through the several plates of the apparatus. By reason of the arrangement of these ducts and the ports connecting them to the cells, the ducts become filled with the electrolyte. They therefore provide a short circuit for the current, and thereby cut down the efficiency of the machine. I have also found by experience that, as water is added to the pipes connecting with these ducts, in order to replenish the apparatus as the electrolyte is decomposed by the current, there arises great uncertainty as to the uniformity of the density of the electrolyte in the successive cells of the series, after the machine has been in operation for some time. In fact, I have found that after the apparatus has been working for a considerable period, the electrolyte in the cells adjacent to the source of diluent supply, remained substantially normal, while that in the cells farthest from the source of supply, became exceedingly dense. This I found to be due to the fact that, as the diluent passes through the supply duct, it takes up electrolyte from the cells which it passes, until toward the end of the apparatus farthest from the point of supply, the diluent becomes practically electrolyte of normal density, so that the cells farthest removed are not replenished by diluent at all. Another object of my invention is to obviate this difficulty.

Another object of the invention is to obtain a high efficiency in such an apparatus and to produce a device in which the working conditions will remain substantially constant, irrespective of the length of time in which the apparatus is in use.

Another object of my invention is to produce such an apparatus in which the gases are delivered as nearly dry as possible, and under pressure, if desired.

With these and other objects in view, my invention consists of certain novel features of construction, combination and arrangement of parts, as will be more fully described and pointed out in the appended claims.

In the drawings, Figure 1 is an end elevation, and Fig. 2 a side elevation of a portion of a filter press type electrolyzer in which are shown some of the novel features of my invention;

Fig. 3 is an end elevation similar to Fig. 1 with some of the well-known portions of the machine omitted, and which illustrates another form of my novel apparatus;

Fig. 4 is an enlarged section on the line 4—4 of Fig. 3;

Fig. 5 is an enlarged cross section on the line 5—5 of Fig. 1;

Fig. 6 is the front elevation of still another form of plate used in forming the cells of an electrolyzer of the filter press type, showing another form of some of my novel features;

Fig. 7 is an enlarged view of one of the diluent inlets in the form of plate illustrated in Fig. 6;

Fig. 8 is another form of plate embodying some of my novel features; and

Fig. 9 illustrates a different form of the apparatus for supplying the diluent to the cells.

The corresponding parts are referred to both in the drawings and in the specification by similar reference characters.

In Figs. 1 and 2, I have illustrated one end of a filter press type electrolyzer of the usual construction with novel features added, the parts omitted being no part of my present invention. H is one of the heads of the apparatus, which are drawn together by means of the rods R in the usual manner. The cells are formed of recessed plates 10 separated by porous diaphragms and gaskets 11. The pressure of the rods R serves to bind the gaskets between the successive plates so that the electrolyte which fills the recesses in the plates cannot leak out. Current is passed through these successive plates in series from any suitable source of electricity, one of the terminals being shown at T. This current, passing through the electrolyte, usually a solution of caustic potash or caustic soda, converts the water therein into hydrogen and oxygen respectively, which are kept separated by the porous diaphragms. This construction is well known and will be understood by those skilled in the art.

In order to carry away the gases, ducts 13 and 14 are provided, being made up of alined openings through the several plates 10 and the diaphragms and gaskets 11, these ducts being connected by pipes 15 to pipes 16 and 17, each of the latter conveying a different gas to a proper holder or receiver. By suitable ports 14′, each of these ducts 13 and 14 is connected respectively to opposite recesses in each of the plates forming the cells.

The pipes 16, 17 are extended downwardly into gas seals consisting of buckets 18, 19, so that moisture in the gases will drop down into these buckets. In order to prevent the electrolyte from entering the ducts 13 and 14, I provide, in the form of plate illustrated in Figs. 1 and 2, barriers 20, 21 in gas chambers above each plate. It will be understood that the gas formed in the recess of any plate passes upwardly through the ports 22 in one case or 23 in the other case into the gas chambers above the plates, and thence behind the barriers 20, 21 into ducts 13, 14. Obviously, if the level of the electrolyte is raised above the top of these barriers, the electrolyte would flow into the ducts 13, 14. This would defeat the object of the barriers, and I therefore provide a device by which the level of the electrolyte may be maintained at substantially a normal level, which usually will be slightly above the recesses in the cell plates. In order to maintain this level, I preferably provide a diluent supply tank 24 with a diluent supply pipe 25 controlled by a float 26 in the well-known manner, so that the surface of the diluent is automatically maintained substantially at a normal level in the tank 24. Because of the difference in the specific gravities of the diluent and the electrolyte, this level in the tank 24 will be higher than the desired level of the electrolyte in the cells. 27 is a sight gage so that the level of the diluent in the tank 24 may be observed. From the tank 24, the diluent passes through suitable pipes 28 to ducts 29, 30, formed in the plates and the diaphragms and gaskets in a manner similar to the ducts 13 and 14. It will be understood that so long as this diluent remains substantially pure water, little or no current will pass through the fluid in the ducts. It will also be understood that, if this diluent is kept substantially pure as it passes from one end of the apparatus to the other, each cell may be replenished so that the density of the electrolyte therein will remain normal. One of the ways in which I accomplish these purposes is illustrated in Fig. 1. In each of the finished surfaces of the plates 10 between which the diaphragm gaskets 11 are bound, I provide grooves 31—32 extending to the lower part of the cell, and ports 33, 34 opening from these grooves into the cell, it being understood that the groove 31 and the port 33 are on one side of the plate, and the groove 32 and the port 34 on the opposite side of the plate. The arrangement of these ports and grooves is further illustrated in Fig. 5. Since each plate 10 of the apparatus is provided with these grooves and ports, the diluent is supplied to each side of each diaphragm of the apparatus.

By arranging the grooves 31, 32 and the ports 33, 34 as I have illustrated, it will be seen that I have produced a hydrostatic balance which will prevent the electrolyte from passing to the ducts 29, 30. The electrolyte being the denser fluid, will not flow up through the grooves 31, 32. On the other hand, when, by reason of the lowering of the electrolyte in the cell, the balance between the two fluids is disturbed, some of the diluent in the groove 32 passes out through the port 34 into the electrolyte, through which it rises until it is thoroughly mixed therewith. Since none of the electrolyte in any of the cells can rise to the ducts 29, 30, these latter will supply pure diluent to each of the cells of the series. Moreover, the water columns in the ducts 29, 30 offer no path to the current.

It will be seen that I have provided in the apparatus illustrated in Figs. 1 and 2 an arrangement by which a pressure is placed on the diluent which is not sufficient to cause the electrolyte to flow into the main gas ducts 13, 14 but which is sufficient to force some of the diluent into the electrolyte when the level of the latter drops below normal. This arrangement therefore provides a means by which automatically the electrolyte in each cell is kept in a uniform condition throughout the apparatus, and at a level to utilize the maximum capacity of the cells, without decreasing the efficiency thereof by offering non-gas-producing circuits for the current.

In Fig. 3, I have illustrated my novel apparatus with a modified form of cell plate. The diluent supply apparatus is the same as shown in Fig. 1, but instead of providing separate gas chambers over the plates, I have obtained equivalent results by placing the gas ducts 35, 36 at the upper part of the plates and considerably above the normal electrolyte level, which I have indicated at 37. The ducts communicate directly through small ports $14^2$ with the recessed spaces of the plates above the electrolyte level. With this form of plate, however, in order to produce the best results, it is desirable to modify the diaphragm between the cells so that the portion thereof above the normal level of the electrolyte shall be made impervious to the gases, to prevent their mixing in the cells. One form of such a diaphragm I have illustrated in Fig. 4, in which the pervious diaphragm 38, usually of asbestos, does not extend quite to the normal level of the electrolyte, the upper edge of it being embedded in the impervious gasket 39, usually of rubber, which may be protected from the action of the electrolyte by thin nickel plated steel sheets 40, if desired. With this arrangement, it is obvious that the diaphragm will permit the passage of the electrolyte through its pervious portion, and will prevent the mixing of the gases through its impervious portion, which extends sufficiently below the normal level of the electrolyte to prevent any fluctuations in the level from exposing any of the pervious portion. Obviously various forms of diaphragms to accomplish this purpose may be used. For instance, the diaphragm may be entirely of asbestos with its upper portion made impervious to the gases by a coat of paint not affected by the electrolyte, such as asphaltum.

In the arrangement just described, it is essential, of course, that the pressure of the diluent shall be sufficient to force it into the electrolyte when the level of the latter falls below the normal, but shall not be sufficient to force the electrolyte into the main gas ducts 35, 36. The apparatus illustrated provides a means to accomplish this.

In Figs. 6, 7, 8, and 9, I have shown different forms of my novel arrangement for supplying the diluent to the cells. In Fig. 6, the supply ducts 41, 42 are placed at the bottom of the cells, communication with the cells themselves being had through the grooves or ports 43, 44, each of the latter connecting one of the ducts with one side of the plate only. In Fig. 7, I have illustrated the action of the diluent and electrolyte in this arrangement, which is also illustrative of the corresponding action in the other forms which I have illustrated. It will be understood that a column of water may rest on top of a column of electrolyte without the two mixing, excepting at a very slow rate, which is negligible for the purpose of my present apparatus. When the machine is first set up, electrolyte is poured into the tank 24, from which it runs into the various cells until the latter are nearly filled to their normal level. Then water will be added on top of the column of electrolyte until the balance between the two is obtained with the electrolyte at its normal level. Preferably, the original amount of electrolyte will be limited so that when this balance is obtained, the ducts 41, 42 will be filled with the diluent and the port 43 partly with the diluent and partly with the electrolyte. As the machine operates, the dividing line between these two columns of different specific gravities will be substantially along the line 44. The weight of the water on the electrolyte will prevent the latter rising above the level 44. However, if any water is added to the tank 24, the increased weight of the diluent column shifts the level 44 downward until some of the water adjacent the line 44 escapes around the bend in the port 43. The water will rise through the electrolyte and mix therewith. Sufficient water escapes to equalize the weights of the two columns, whereupon the level 44 is again restored to the position shown in Fig. 7. In general, in order to carry out this feature of my invention, it is essential that the dividing line between the column of diluent and the column of electrolyte shall be located so that the diluent supply duct shall be a part of the column of diluent.

In the arrangement shown in Fig. 8, the diluent main supply ducts, 45, 46 are carried by the supporting ears of the cell plates 10, from which, through suitable grooves 47, 48, the diluent is carried to the lower part of the cells.

In Fig. 9, I have shown an arrangement in which the diluent supply ducts 50, 51 are entirely outside of the cell plates, and above the normal level of the electrolyte. Each cell is supplied on either side by suitable pipes 52, 53, which, in order to prevent short-circuiting of the current, are connected to the supply pipes 50, 51 through insulating connections 54, which may be rubber tubes. It is obvious that in this arrangement the electrolyte can never reach the ducts 50, 51, since they are higher than the level of the electrolyte in the cells. This arrangement is, in some respects, not so good as those previously described, since it involves separate insulation for the diluent auxiliary ducts. In the other forms in which the ducts are formed in the plates, the insulation is furnished by the gaskets necessarily provided between the plates.

In some cases, it is desirable to generate the gases under pressure, so that subsequent compression thereof is unnecessary. When it is desired to operate my novel apparatus in this manner, the cover 60 on the tank 24 is hermetically sealed and the pipe 61 is connected to one of the gas outlet pipes 16, 17, as in Fig. 3, preferably on the oxygen side. When so arranged, it will be obvious that the pressure in the chamber above the diluent in the tank 24 will be the same as that above the electrolyte in the cells, so that the conditions of operation which I have heretofore explained will not be disturbed, the diluent flowing into the electrolyte according to whether or not the weights of the two columns of liquids are unequal or equal. When gas is generated under pressure, it will be understood that it is delivered to suitable holders arranged to create the pressure required. When the apparatus is arranged for generation under pressure, the buckets 18—19 are hermetically sealed so as to prevent the gases from escaping from the pipes leading into them, or else the lower part of the pipes 16 are closed up.

While I have shown my diluent supply as entering the cells at or near the bottom thereof, it should be understood that this arrangement is not essential. I find it desirable, however, since the diluent being lighter than the electrolyte, rises therethrough, and hence becomes thoroughly mixed therewith, whereas if it were added to the top of the electrolyte, the mixture would tend to become un-uniform in different portions of the cell.

It will be understood that while I have illustrated my invention in connection with the filter press type of electrolyzer, many features thereof will be useful in other types of electrolytic apparatus.

It will also be understood that the apparatus shown in the drawings is merely for the purpose of illustration and that my invention may be carried out in many different forms.

I claim:

1. A plurality of electrolytic cells in series, a horizontal diluent supply duct located below the level of the electrolyte in said cells, auxiliary ducts, each connecting said supply duct with one of said cells, and means to give a pressure to the diluent in said supply duct and said auxiliary ducts, said auxiliary ducts and said pressure means being constructed and arranged to cause the diluent to flow from said supply duct to one of said cells and to prevent the electrolyte from flowing from said cell into said supply duct.

2. A plurality of electrolytic cells in series, a horizontal diluent supply duct, auxiliary ducts, each connecting said supply duct with one of said cells at the lower part thereof, and means to give a pressure to the diluent in said supply duct and said auxiliary ducts, said auxiliary ducts and said pressure means being constructed and arranged to cause the diluent to flow from said supply duct to one of said cells and to prevent the electrolyte from flowing from said cell into said supply duct.

3. An electrolytic apparatus having a plurality of cells in series, and employing an electrolyte heavier than water, horizontal main gas ducts connected to each of said cells to carry away the gases formed respectively on the anodes and cathodes thereof and means for supplying water to each of said cells at a pressure sufficient to cause it to flow into said cells when the level of the electrolyte falls below normal but insufficient to cause the electrolyte to flow into said main gas ducts.

4. An electrolytic apparatus of the filter press type having a plurality of cells in series composed of a purality of parallel, vertically disposed, recessed plates, held face to face, main gas ducts extending through said plates horizontally and connected to each of said cells to carry away the gases formed respectively on the anodes and cathodes of said cells, and means for supplying a diluent to each of said cells at a pressure sufficient to cause it to flow into said cells when the level of the electrolyte falls below normal but insufficient to cause the electrolyte to flow into said main gas ducts.

5. An electrolytic cell comprising a pair of recessed plates, a diaphragm therebetween and means for maintaining the surface of the electrolyte at approximately a predetemined normal level, said diaphragm being porous below the normal level of the electrolyte and non-porous above such level.

6. An electrolytic cell comprising a pair of recessed plates, a diaphragm therebetween, means for maintaining the surface of the electrolyte at approximately a predetermined normal level, said diaphragm being porous below the normal level of the electrolyte and non-porous above such level and ducts connected to said cell above such normal level and arranged to carry away respectively the gas formed on the opposite sides of said diaphragm.

7. An electrolytic apparatus of the filter press type, having a plurality of cells in series composed of a plurality of parallel, vertically disposed, recessed plates placed face to face, a diaphragm between each pair of said plates, and means for maintaining the surface of the electrolyte at approximately a predetermined normal level, said diaphragm being porous below the normal level of the electrolyte and non-porous above such level.

8. In an electrolytic apparatus for generating gases under pressures, a pair of plate electrodes, a diaphragm therebetween, a diluent reservoir and ducts to convey the diluent to the electrolyte, gas ducts constructed and arranged to carry away the gases formed in the apparatus and means to produce a pressure over the diluent in said reservoir equal to that in said gas ducts.

9. An electrolytic apparatus, comprising a plurality of recessed plates, an insulating diaphragm between each pair of said plates, said plates and diaphragms being provided with alined openings to form respectively a pair of gas ducts and a diluent supply duct, a source of diluent supply connected to said diluent supply duct, and auxiliary ducts connecting said gas ducts and said supply duct with the cells formed between each pair of plates, said gas and supply ducts, said source of diluent supply and said auxiliary ducts being constructed and arranged to prevent the electrolyte from entering said gas and supply ducts.

10. An electrolyzer comprising a plurality of flat plates held face to face, said plates being recessed to form a cell between the faces thereof and closed to egress of electrolyte from said cells, a diaphragm between each pair of said plates to keep the gas formed on the face of one plate separate from the gas formed on the face of the adjacent plate, a horizontal duct connected to each cell and passing through the upper portion of each plate, and means for supplying a diluent to each cell, constructed and arranged to prevent the electrolyte in said cells from flowing into said duct.

11. An electrolytic cell, a diluent supply duct, having two diverging arms, one of which connects with said cell below the level of the electrolyte therein, and means to give a pressure to the diluent in said duct sufficient to maintain a hydrostatic balance between the diluent and the electrolyte with the surface of contact of the two fluids at the junction of the arms, whereby any decrease in the pressure of the electrolyte will cause the surface of contact to shift to permit some of the diluent to pass into the electrolyte.

12. An electrolytic apparatus of the filter press type, having a plurality of cells in series composed of a plurality of parallel, vertically disposed, recessed plates, a diaphragm between each pair of said plates, main gas ducts extending through said plates and connected to each of said cells to carry away the gases formed respectively on the anodes and cathodes of said cells, a diluent supply tank, a diluent supply duct extending through said plates, auxiliary supply ducts connecting said diluent supply duct with each of said cells below the level of the electrolyte therein, and automatic means for supplying diluent to said diluent supply tank, constructed and arranged to maintain the level of the diluent therein so as to give the diluent in said supply duct a pressure insufficient to force the electrolyte into said gas ducts but sufficient to cause the diluent to flow into said cells when the level of the electrolyte falls below normal.

13. An electrolytic cell comprising an anode and a cathode and employing an electrolyte heavier than water, said cell being closed to the egress of the electrolyte, and means to supply water to said cell under a constant predetermined pressure equal to the combined pressure of the electrolyte and the gas in said cell.

14. An electrolytic cell comprising an anode and a cathode, and means for supplying a diluent to said cell under a constant predetermined pressure, said cell and said means being constructed and arranged to prevent the circulation of the electrolyte through the diluent supply and through said cell.

15. An electrolytic cell comprising an anode and a cathode, a source of diluent supply, and means to supply the diluent to said cell from said source only at the rate the diluent is decomposed in said cell and at a constant, predetermined pressure.

HARRY T. SHRIVER.

Witnesses:
 H. L. GRIFFIN,
 BYRON W. VREDENBURGH.